US007266388B2

(12) United States Patent
Ishii

(10) Patent No.: US 7,266,388 B2
(45) Date of Patent: Sep. 4, 2007

(54) TRANSMITTING CIRCUIT AND COMMUNICATION TERMINAL UNIT THEREWITH

(75) Inventor: Katsuhiro Ishii, Tokyo (JP)

(73) Assignee: NEC Corporation, Tokyo (JP)

( * ) Notice: Subject to any disclaimer, the term of this patent is extended or adjusted under 35 U.S.C. 154(b) by 912 days.

(21) Appl. No.: 10/090,819

(22) Filed: Mar. 6, 2002

(65) Prior Publication Data
US 2002/0132637 A1 Sep. 19, 2002

(30) Foreign Application Priority Data
Mar. 19, 2001 (JP) ............... 2001-078439

(51) Int. Cl.
*H04B 7/00* (2006.01)
*H04B 1/06* (2006.01)
(52) U.S. Cl. ............... 455/553.1; 455/127.3; 455/169.1; 455/195.1
(58) Field of Classification Search ........... 455/553, 455/95, 575, 101, 127.1, 127.4, 194.2, 188.1, 455/13.4, 463, 550.1, 574, 73, 75, 77, 78, 455/82, 553.1, 552.1, 91, 114.3, 127.3, 130, 455/136, 140, 168.1, 169.1, 195.1
See application file for complete search history.

(56) References Cited

U.S. PATENT DOCUMENTS

| | | | |
|---|---|---|---|
| 3,891,926 A | 6/1975 | Ishman et al. | |
| 5,122,878 A | 6/1992 | Heigl et al. | |
| 5,737,697 A * | 4/1998 | Yamada | ............ 455/126 |
| 5,926,466 A * | 7/1999 | Ishida et al. | ............ 370/280 |
| 5,973,568 A | 10/1999 | Shapiro et al. | |
| 6,054,902 A * | 4/2000 | Masato | ............ 330/306 |
| 6,201,952 B1 * | 3/2001 | Shimizu et al. | ............ 455/180.1 |
| 6,297,694 B1 * | 10/2001 | Yamamoto | ............ 330/51 |
| 2002/0006810 A1 * | 1/2002 | Schiller | ............ 455/552 |
| 2002/0101907 A1 * | 8/2002 | Dent et al. | ............ 375/132 |

FOREIGN PATENT DOCUMENTS

| | | |
|---|---|---|
| CN | 1191422 A | 8/1998 |
| GB | 2 365 696 A | 2/2002 |
| JP | 3-195929 | 8/1991 |
| JP | 5-11588 | 2/1993 |
| JP | 2754993 | 3/1998 |
| WO | WO98/00927 A1 | 1/1998 |

* cited by examiner

*Primary Examiner*—Tony T. Nguyen
(74) *Attorney, Agent, or Firm*—Sughrue Mion, PLLC

(57) ABSTRACT

When a signal of GSM 900 frequency band is transmitted, a bias voltage setting circuit sets an optimum bias voltage for the GSM 900 frequency band to a first stage amplifier and a second stage amplifier. The transmission signal is amplified by the two amplifiers. A signal that is output from the second stage amplifier is supplied to a low-pass filter. The low-pass filter attenuates unnecessary radiation waves from the transmission signal. A GSM 900 frequency band amplifier amplifies the output signal of the low-pass filter and outputs the amplified signal. When a signal of DCS 1800 frequency band is transmitted, the bias voltage setting circuit sets an optimum bias voltage for the DCS 1800 frequency band to the first stage amplifier and the second stage amplifier. A DCS 1800 frequency band amplifier amplifies an output signal of the second stage amplifier and outputs the amplified signal.

8 Claims, 1 Drawing Sheet

1: FIRST STAGE AMPLIFIER
2: SECOND STAGE AMPLIFIER
3: LOW-PASS FILTER
4: HIGH-PASS FILTER
5: GSM 900 FREQUENCY BAND AMPLIFIER
6: DCS 1800 FREQUENCY BAND AMPLIFIER
7: BIAS VOLTAGE SETTING CIRCUIT

11: FIRST STAGE AMPLIFIER
12: SECOND STAGE AMPLIFIER
13, 14: LAST STAGE AMPLIFIERS 21, 31: FIRST STAGE AMPLIFIERS
22, 32: SECOND STAGE AMPLIFIERS
23, 33: LAST STAGE AMPLIFIERS

1: FIRST STAGE AMPLIFIER
2: SECOND STAGE AMPLIFIER
3: LOW-PASS FILTER
4: HIGH-PASS FILTER
5: GSM 900 FREQUENCY BAND AMPLIFIER
6: DCS 1800 FREQUENCY BAND AMPLIFIER
7: BIAS VOLTAGE SETTING CIRCUIT ated description of preferred embodiments

TRANSMITTING CIRCUIT AND COMMUNICATION TERMINAL UNIT THEREWITH

BACKGROUND OF THE INVENTION

1. Field of the Invention

The present invention relates to a transmitting circuit for use with a mobile communication terminal unit, and in particular, to that using plural transmission frequency bands.

2. Description of the Related Art

In the art of mobile communication, as the number of terminal units that are used is increased at an explosive pace, the traffic is also drastically increased. Thus, there are plural systems whose frequency bands are far apart. In addition, to improve users' convenience, there are market's needs of which one terminal unit can use the plural systems.

In such a background, it is preferred to commonly use a part of circuits for plural frequency bands that are far apart, not mount all these circuits, from view points of cost and mounting area. This point is clear because there are market's needs in which terminal units tend to become small.

FIGS. 1 and 2 show examples of structures of conventional transmission power amplifier circuits that can transmits signals of plural frequency bands. FIG. 1 shows an example of the structure of which a first stage amplifier and a second stage amplifier commonly use two frequency bands. FIG. 2 shows an example of the structure of which circuits for two frequency bands are independently disposed.

However, in the example of the structure shown in FIG. 1, although the number of structural parts is small, when the two frequency bands are far apart, it is very difficult to assure high efficiencies of a first stage amplifier 11 and a second stage amplifier 12. In addition, characteristics such as distortion of one frequency band are remarkably restricted. Moreover, depending on the structures of the first stage amplifier 11 and the second stage amplifier 12, it is impossible to decrease the levels of unnecessary radiation waves with last stage amplifiers 13 and 14.

Unlike with the structure shown in FIG. 1, with the structure shown in FIG. 2, efficiencies and various characteristics of first stage amplifiers 21, 31 and second stage amplifiers 22, 32 can be optimized in their frequency bands. However, in this case, semiconductor dies for the first and second stage amplifiers and a space for matching circuits disposed upstream thereof are necessary in proportion to the number of frequency bands. Thus, this structure is not suitable from view points of cost and size.

In other words, when the conventional power amplifiers uses plural transmission frequencies, plural circuits having the same structure are disposed at the sacrifice of circuit scale. Alternatively, a part of circuits is commonly used at a sacrifice of efficiency and distortion of particular frequency band.

SUMMARY OF THE INVENTION

An object of the present invention is to provide a transmitting circuit having transmission power amplifiers commonly used for plural frequency bands so as to reduce the number of structural parts and obtain optimal efficiencies and characteristics for individual frequency bands.

To solve the above-described problem, the present invention is directed to a transmitting circuit using plural transmission frequency bands, comprising an input stage amplifier for amplifying an input signal, an operating condition setting circuit for controlling an optimally amplified frequency band by setting an operating condition of the input stage amplifier, a high-pass filter and a low-pass filter connected to an output of the input stage amplifier, a high-frequency-band last stage amplifier, disposed corresponding to the high-pass filter, for amplifying a signal of frequency band passed by the high-pass filter; and a low-frequency-band last stage amplifier, disposed corresponding to the low-pass filter, for amplifying a signal of frequency band passed by the low-pass filter. The input stage amplifier is composed of transistors. The operating condition setting circuit sets a bias voltage of the transistors.

These and other objects, features and advantages of the present invention will become more apparent in light of the following detailed description of preferred embodiments thereof, as illustrated in the accompanying drawings.

DESCRIPTION OF THE PREFERRED EMBODIMENTS

Next, with reference to the accompanying drawing, embodiments of the present invention will be described.

Figure 1:
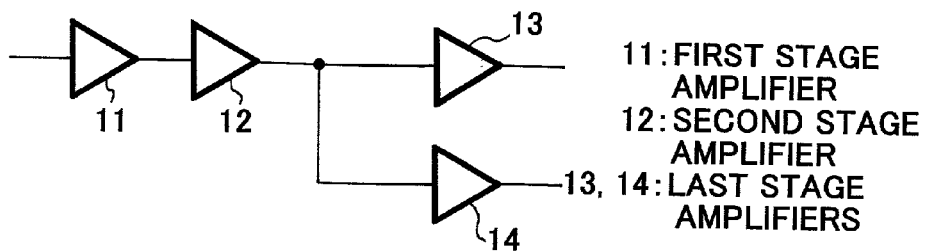
FIG. 1 is a block diagram showing a conventional structure of first and second stage amplifiers commonly used for plural frequency bands.
Figure 2:
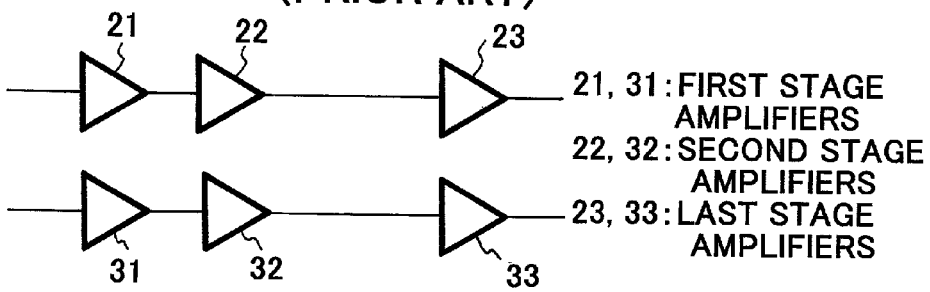
FIG. 2 is a block diagram showing a conventional structure of circuits for two frequency bands which are independently disposed.
Figure 3:
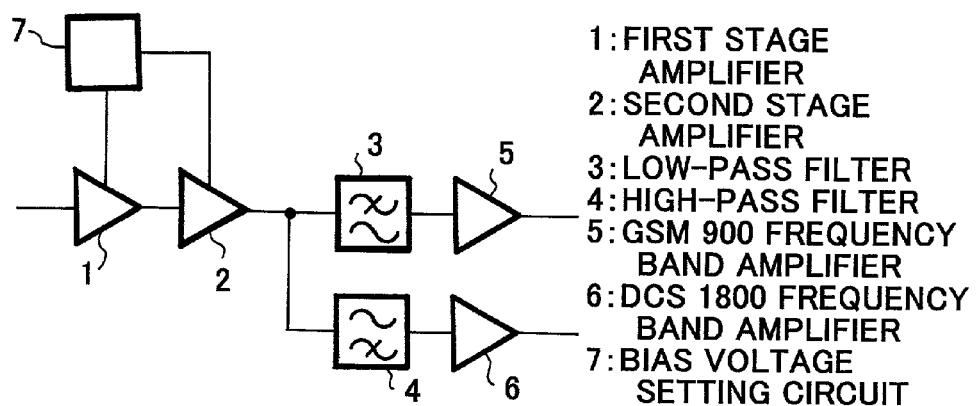
FIG. 3 is a block diagram showing a structure of a dual-band power amplifier according to the present invention.

FIG. 3 is a block diagram showing the structure of an internal circuit of a GSM (Global System for Mobile communications) 900/DCS (Digital Cellular System) 1800 dual frequency band power amplifier according to the present invention. According to the embodiment of the present invention, GSM 900 frequency band and DCS 1800 frequency band represent a frequency band of around 900 MHz and a frequency band of around 1800 MHz, respectively.

A transmitting circuit according to the embodiment comprises a first stage amplifier 1, a second stage amplifier 2, a low-pass filter 3, a high-pass filter 4, a GSM 900 frequency band amplifier 5, a DCS 1800 frequency band amplifier 6, and a bias voltage setting circuit 7. The transmitting circuit amplifies a signal that is input to the first stage amplifier 1 and outputs an amplified signal. The first stage amplifier 1 and the second stage amplifier 2 compose an input stage amplifier.

Each of the first stage amplifier 1, the second stage amplifier 2, the GSM 900 frequency band amplifier 5, and the DCS 1800 frequency band amplifier 6 is composed of an FET (Field Effect Transistor) or an HBT (Hetero Bipolar Transistor) produced by GaAs process. Each of these amplifiers amplifies an input signal and outputs an amplified signal. The low-pass filter 3 passes only a signal of GSM 900 frequency band and attenuates other unnecessary waves. Likewise, the high-pass filter 4 passes only a signal of DCS 1800 frequency band and attenuates other unnecessary waves. The bias voltage setting circuit 7 sets an operating voltage of transistors that compose the first stage amplifier 1 and the second stage amplifier 2 corresponding to an external control signal. According to the embodiment, the first stage amplifier 1 and the second stage amplifier 2 are operated in class C amplification. All these amplifiers and filters are formed on the same semiconductor die such as MMIC (Monolithic Microwave Integrated Circuit) or the like. A pair-chip on which these devices are formed is mounted on a ceramic multi-layer substrate.

Next, the case that the transmitting circuit having the above-described structure is operated in the GSM 900 frequency band will be described. The bias voltage setting circuit 7 sets the first stage amplifier 1 and the second stage amplifier 2 to an optimum bias voltage for the GSM 900 frequency band. The two amplifiers amplify a transmission signal of GSM 900 frequency band. Unnecessary radiation waves of the signal that is output from the second stage amplifier 2 are attenuated by the low-pass filter 3. The GSM 900 frequency band amplifier 5 finally amplifies the output signal of the low-pass filter 3 and outputs the amplified signal with a power of 1 W. At this time, the DCS 1800 frequency band amplifier 6 stops its operation.

Likewise, when the transmitting circuit is operated in the DCS 1800 frequency band, the bias voltage setting circuit 7 sets the first stage amplifier 1 and the second stage amplifier 2 to an optimal bias voltage for the DCS 1800 frequency band. At this time, the GSM 900 frequency band amplifier 5 stops its operation. The DCS 1800 frequency band amplifier 6 finally amplifies a signal that is output from the second stage amplifier 2 and outputs the amplified signal with a power of 1 W. The other operations are the same as those that were described above.

When such power amplifiers are mainly composed of GaAs devices, it is very difficult to assure high efficiencies of the first stage amplifier 1 and the second stage amplifier 2 in wide frequency bands. Thus, depending on each frequency band, the bias voltage and the operating condition are varied and set to obtain the optimum efficiency.

According to the embodiment, a dual-band power amplifier of GSM 900 frequency band and DCS 1800 frequency band was described. However, the present invention can be applied to a power amplifier that amplifies signals of other frequency bands. According to the embodiment, a part of transmitting circuits for two frequency bands is commonly used. However, according to the present invention, the number of transmission frequency bands is not limited to two.

According to the embodiment, the first stage amplifier 1 and the second stage amplifier 2 are class C amplifiers that have high efficiencies, but relatively large distortions. However, according to the present invention, the first stage amplifier 1 and the second stage amplifier 2 are not limited to the class C amplifiers. Instead, the first stage amplifier 1 and second stage amplifier 2 may be class A amplifiers, class B amplifier, class F amplifiers, or the like.

According to the embodiment, all the amplifiers and filters are formed on the same semiconductor die. However, according to the present invention, they may be formed on plural dies or by plural parts. In this case, the superiority of the embodiment deteriorates from a view point of mounting area.

According to the embodiment, each amplifier is composed of a transistor and the bias voltage setting circuit varies the operating voltage of each amplifier. However, according to the present invention, as long as the optimum efficiencies or frequency bands can be varied, any means can be used.

According to the embodiment, the power amplifiers are composed of devices produced by GaAs process. However, according to the present invention, the power amplifiers may be composed of devices produced by silicon or other compound semiconductor process.

Next, the structure of a communication terminal unit in which the transmitting circuit according to the present invention is disposed will be described. In the communication terminal unit, an antenna that can transmit and receive signals of both the GSM 900 frequency band and the DCS 1800 frequency band is disposed. When a signal is received, the signal received by the antenna is amplified by a receiving circuit. An output signal of the receiving circuit is demodulated by a demodulating circuit. The demodulated signal is processed for an audio output and a picture output by a base band signal processing circuit.

When a signal is transmitted, a command for designating a frequency band for use is input. An optimum bias voltage for the frequency band is set to an input stage amplifier of the transmitting circuit. A signal of an audio input or a data input is processed by the base band signal processing circuit. The processed signal is modulated by a modulating circuit. The modulated signal is amplified for a transmission signal of the frequency band designated by the transmitting circuit. Depending on whether a signal is received or transmitted, the connection of the receiving circuit or the transmitting circuit to the antenna is switched by a switching circuit.

As was described above, when the transmitting circuit according to the present invention is used, the input stage amplifier is shared between each frequency band. The efficiencies and various characteristics of distortions and others are optimized each frequency band. Thus, it is not necessary to dispose plural input stage amplifiers. In other words, the number of circuit parts can be decreased. As a result, the size of the apparatus can be reduced.

In addition, since the transmitting circuit according to the present invention has an internal filter for suppressing unnecessary radiation waves, it is not necessary to dispose the filter for suppressing unnecessary radiation waves downstream. Thus, the total number of filters required for the circuit can be reduced.

Although the present invention has been shown and described with respect to preferred embodiments thereof, it should be understood by those skilled in the art that the foregoing and various other changes, omissions, and additions in the form and detail thereof may be made therein without departing from the spirit and scope of the present invention.

What is claimed is:

1. A transmitting circuit using plural transmission frequency bands, comprising:
   an input stage amplifier for amplifying an input signal;
   an operating condition setting circuit for controlling an optimally amplified frequency band by setting an operating condition of the input stage amplifier;
   a high-pass filter and a low-pass filter connected to an output of the input stage amplifier;
   a high-frequency-band last stage amplifier, disposed corresponding to the high-pass filter, for amplifying a signal of frequency band passed by the high-pass filter; and
   a low-frequency-band last stage amplifier, disposed corresponding to the low-pass filter, for amplifying a signal of frequency band passed by the low-pass filter.

2. The transmitting circuit as set forth in claim 1,
   wherein the input stage amplifier is composed of transistors, and
   wherein the operating condition setting circuit sets a bias voltage of the transistors.

3. The transmitting circuit as set forth in claim 1,
wherein the high-pass filter and the high-frequency-band last stage amplifier correspond to the DCS 1800 frequency band, and
wherein the low-pass filter and the low-frequency-band last stage amplifier correspond to the GSM 900 frequency band.

4. The transmitting circuit as set forth in claim 1, wherein the input stage amplifier is a class C amplifier.

5. The transmitting circuit as set forth in claim 1, wherein all the amplifiers and filters are formed on the same semiconductor die.

6. The transmitting circuit as set forth in claim 1, wherein each of the amplifiers is produced by GaAs process.

7. A communication terminal unit, comprising:
an antenna for transmitting and receiving a signal; a receiving circuit for amplifying the signal received by the antenna;
a demodulating circuit for demodulating the signal received from the receiving circuit;
a base band signal processing circuit for processing the demodulated signal;
a modulating circuit for modulating the signal processed by the base band signal processing circuit;
a transmitting circuit for amplifying the modulated signal to transmit, the transmitting circuit being as set forth in one of claims 1 to 6;
means for designating a transmission frequency band to the operating condition setting circuit of the transmitting circuit; and
a switching circuit for selectively connecting the receiving circuit or the transmitting circuit to the antenna.

8. The transmitting circuit according to claim 1 wherein said operating condition setting circuit sets at least two operating conditions of the input stage amplifier, one set of operating conditions optimized for one frequency band and a second set of operating conditions optimized for a second frequency band.

* * * * *